United States Patent [19]

Candy

[11] Patent Number: 4,894,618
[45] Date of Patent: Jan. 16, 1990

[54] METAL DETECTOR USING CROSS-CORRELATION BETWEEN COMPONENTS OF RECEIVED SIGNALS

[75] Inventor: Bruce H. Candy, Basket Range, Australia

[73] Assignee: Minelab Electronic Industries Ltd., Adelaide, Australia

[21] Appl. No.: 61,276

[22] PCT Filed: Aug. 29, 1986

[86] PCT No.: PCT/AU86/00253
§ 371 Date: May 19, 1987
§ 102(e) Date: May 19, 1987

[87] PCT Pub. No.: WO87/01463
PCT Pub. Date: Mar. 12, 1987

[30] Foreign Application Priority Data

Aug. 29, 1985 [AU] Australia ............................. PH02201

[51] Int. Cl.$^4$ ........................ G01V 3/11; G01R 33/12
[52] U.S. Cl. .................................... 324/329; 324/233; 324/239
[58] Field of Search ...................... 324/233, 239, 329; 361/180

[56] References Cited

U.S. PATENT DOCUMENTS

| | | | |
|---|---|---|---|
| 3,621,380 | 11/1971 | Barlow | 324/323 X |
| 3,975,674 | 8/1976 | McEuen | 324/357 |
| 4,628,265 | 12/1986 | Johnson et al. | 324/329 |
| 4,677,384 | 6/1987 | Payne | 324/329 |
| 4,700,139 | 10/1987 | Podhrasky | 324/329 |
| 4,719,421 | 1/1988 | Kerr | 324/233 |

*Primary Examiner*—Gerard R. Strecker
*Attorney, Agent, or Firm*—Cushman, Darby & Cushman

[57] ABSTRACT

An apparatus is described for detecting metal objects in an interrogated environment. An alternating magnetic signal is transmitted, and received by a receiving coil. The signal is amplified, and is then synchronously demodulated based on a transmitted frequency. The synchronously demodulated signals are low-pass filtered, and then changes in the amplitude of these low-pass filtered signals are detected. The outputs are cross-correlated and interrograted, and are used to control a controlled phase shifter. The output of the controlled phase shifter is used as a reference input to a first one of the synchronous demodulators, and a shifted transmitted signal is used as a reference to the second synchronous demodulator.

16 Claims, 6 Drawing Sheets

METAL DETECTOR USING CROSS-CORRELATION BETWEEN COMPONENTS OF RECEIVED SIGNALS

This invention relates to metal detection apparatus and in particular to maintaining substantial discriminatory sensitivity in mineralized environments.

In this specification the term "metal detector" is used to refer to detectors of a type used for the purpose of discriminating metal within the ground but it can also be used to refer to a single detector or an array of detectors where used to detect metal objects in soil on a moving conveyor system. Such a system may be used, for example, to locate gold nuggets in soil moving on the conveyor system.

The invention is directed to some of the difficulties encountered when using a detector in the presence of ground containing varying proportions of minerals magnetic characteristics of which may vary from one location to another.

These minerals, such as ferrous oxides may produce strong signals in the detector which make identification of a target signal (for example, a signal from a gold nugget) difficult to identify, that is these strong variable ground signals can "mask out" the signal from a target object. The extent of this difficulty is very dependent on ground conditions.

There are a number of types of metal detectors each having a different method of operation. There is however a common principle of operation common to all these types of detectors. This involves the production of a magnetic field by a coil.

A conducting material within an effective range will interact with this field and change characteristics of the field which characteristics can then be analysed.

This invention is directed to a type of metal detector known as an alternating magnetic field metal detector where the field variations are substantially sinusoidal.

This will include detection electronic circuitry which compares the phase and magnitude of an emf signal induced in a receiver coil with that of a transmitted signal.

The object of this invention is to provide means by which there can be more effective detecting in a discriminatory way in such conditions ground containing mineralisation, particularly where the magnetic characteristics are variable spatially.

It is well known that an induced signal in any material may have a phase relationship that is useful in identifying it's magnetic characteristics; this phase relationship can be referred to in terms of quadrature components of the signal. These can be characterised by a purely reactive component and at 90 degrees to this, a purely resistive component which is some times refered to as the loss component.

In general, mineralised ground will provide a large reactive component and a small loss component whereas conducting objects, because of eddy currents, generated within them have large loss components by comparison.

It is this difference which allows for the possibility of locating conducting objects even when mineralisation in the ground produces a large return signal.

The best available conducting metal target detectors use two synchronous demodulators known as the "X" and "R" channel, such that the "X" channel has it's sensitive component axis aligned within a small angle of the purely reactive retransmitted components, and the "R" channel has it's sensitive component axis aligned within a small angle of the purely resistive retransmitted components. The sensitive axis of the "R" channel can be manually varied in order to align it so that it is at quadrature with the ground vector. The detector is said to be gound balanced for the areas of ground whose vector is aligned at quadrature with the sensitive axis of the "R" channel. For these detectors the "R" channel is known as the "object channel". Ground balancing can also be achieved by adding a proportion of the "X" channel to the "R" channel by control of the proportion added. For detectors using this latter ground balancing method the composite signal is called the "object channel". Many detectors do not provide for either of these controls.

U.S. Pat. No. 4,128,803 uses an "X" and "R" signals channel and a third demodulator between these two channels to detect and identify the target.

U.S. Pat. No. 4,024,468 describes an attempt being made to discriminate between different types of metal objects by amplitude discrimination.

U.S. Pat. 4,099,116 and 4,300,097 uses a phase angle setting to discriminate between various types of ferrous and non ferrous objects. Various feedback circuits from the "X" channel are used to compensate for the mineralised component signal in the discriminator circuit.

U.S. Pat. No. 4,303,879 discloses an automatic tuning circuit between mode selection, with manual ground cancellation.

U.S. Pat. No. 4,344,034 uses a double detector circuit in which the second detector circuit attempts to eliminate ground signal from the first discriminating circuit.

In all these patents together with U.S. Pat. No. 4,507,612, U.S. Pat. No. 4,325,027, U.S. Pat. No. 4,470,015 and U.S. Pat. No. 4,514,692 the emphasis is in target identification in mineralised soil conditions. However the common difficulty encountered by all these techniques concerns the variability of the ground. The setting of the electronic controls which will, to a large extent, eliminate the interference from the ground have to be changed as the detector is moved from one region to another and the ground mineralisation composition changes. Sometimes this ground variation is minimal, slowly varying, and only substantially involves variations in the concentration of mineralisation, whereas other ground is also characterised by rapid spacial changes in the angle of the ground vector relative to the "pure " axis described above.

One well known technique to try and overcome this difficulty is to run the detector in the "Auto" or "A.C." mode.

In this mode of operation low frequency components of the signal are filtered out and in this way slow variations due to ground mineralisation are removed and only the high frequency components of the signal (which may be due to the required object) remain.

Thus the compensating feedback circuits described in some of the above patents and other techniques employing high pass filtering (U.S. Pat. No. 4,470,015 and U.S. Pat. No. 4,507,612) and differentiating circuits (U.S. Pat. No. 4,514,692) are employed. U.S. Pat. No. 4,507,612 employs high Q high pass filters to remove ground signals and then uses a feedback circuit to determine the phase angle of the target, for target identification purposes.

In all mineralised ground it is necessary to periodically manually adjust the ground balance control to minimise the signal due to the changes in the mineralisation concentration for optimum performance. This procedure, although inconvenient, is satisfactory provided the character of the mineralisation is constant over regions extending over many meters.

In areas where the phase angle of the ground spatially varies rapidly, manual ground balance adjustment is impractical but, if not carried out, will result in large signals in the object channel due to changing mineralisation concentration, thereby substantially reducing the ability to detect signals from target objects. These high frequency components of the ground signal can be much greater than remote or small target signals, and this is particularly the case near ironstone reefs where the adjustment may have to be made at intervals as close as one metre or even less. Detectors with no means for ground balancing are particularly inadequate in these conditions.

Prospecting under these conditions is extremely difficult and tedious and, despite their potential for producing gold, these regions are accordingly avoided by prospectors.

An object to which this invention is directed then is to assist in reducing the above difficulties.

In accordance with this invention there is apparatus for detecting remote metal objects in soil by interrogation using substantially sinusoidal magnetic transmitted signals for such interrogation the apparatus including a correlator, the apparatus being characterised in that there are means to effect at least two signals derived from incoming interrogation signal or signals by synchronous demodulation referenced to the said transmitted signal, the apparatus being adapted such that one of the said signals contains information distinctive of changes during different soil interrogation over time in soil background magnetic response and any target metal object at the transmitted frequency, and the other signal will contain substantially that information arising from changes over time in the said retransmitted magnetic field from interrogation from a moving source of transmitted signal relative to a target of any target conducting metal object, but relatively little information arising from differences in the ground background magnetic response from interrogated location to location, means to provide for amplitude cross correlation between the two signals by means of the correlator, the said correlator being adapted to alter the said second signal in such a way that the said correlation between the said signals is minimised within a selected response period as the apparatus interrogates different areas of soil locations.

In accordance with one form of this invention an alternating current is produced in a transmitting coil producing a magnetic field which interacts with the immediate environment. The induced emf signal in a receive coil is demodulated with reference to the phase of the alternating current in the transmitting coil to produce an "R" channel and an "X" channel described above. The induced signal in the receive coil results from two sources, namely, directly from the currents flowing in the transmitting coil, and varying magnetic sources in the local environment under the influence of the transmitted magnetic field.

The transmitter coil and the receiver coil are normally set up so that when the coils are remote from the ground or other objects the signal induced in the receiver coil is substantially a minimum.

In this situation, it is said that the sensing coils are "nulled".

Consider for the sake of clarity, an ideal situation where the capacitance between windings of both the transmitting coil and the receiving coil is negligible. Also consider that the load presented to the receiving coil by the detection electronics is effectively infinite. Furthermore consider that induced eddy currents in the transmitter or receiver coil are negligible.

Thus for purposes of explanation only, in the description which follows, the receive signal may be considered as the induced emf resulting from the alternating flux due to the transmitting coil. For each Fourier component transmitted, the corresponding voltage component in the receive coil has a phase angle of 90° relative to the current in the transmitter coil. This induced component will be called the purely reactive component, where the measured, so called "X" component has a component vector within 10 degrees of the purely reactive component. Any induced received Fourier components with the same (or opposite) phase as the transmitted current will be called purely resistive components, where the measured so called "R" component has a component vector within 10 degrees of the purely resistive component.

Received signals resulting from local environmental sources in general induce both resistive and reactive components in the receiving coil. Two sources dominate in most ground.

One is from ferrous oxides which have a reactive component much larger than the resistive component, and the second from mildly electrically conductive sources such as moisture containing salts, clays and carbon deposits, all of which have small reactive components and large resistive components at audio frequencies. In ground containing very heavy ferrous oxide deposits (heavy ironstone deposits) the reactive component can dominate the resistive component by as much as 100:1.

Usually the resistive component variations of the second source above in the ground is not correlated with the reactive component variations. However, the resistive component of the ferrous oxides is correlated well with its reactive component.

The invention described and claimed herein comprises metal detector apparatus incorporating a system for correlating changes in the "X" and object channel signal with time, as the sensing coil passes from one area of soil to another, on a continuous or repeating basis to produce a correction signal which can be used to minimise those component variations in the "X" signal correlated with those simultaneous variations in the object channel signal in the object channel. Changes over time in the "X" and "R" or object channel can be determined by the use of high pass filters.

The method for effecting ground balancing can consist of either a system for automatically rotating the reference phase angle for the "R" component, or shifting the phase of the signal from the receive coil, or multiplication of the "X" component by a factor determined by the correlated signal and subtracted from the "R" component signal.

By this means the detector is continuously adjusted to substantially reject signals in the "R" channel arising from changes in the magnitude of the mineralised component in the ground as the character of the mineralisation changes. The strength of the interrogated signal in hand held detectors is modulated by the swinging action of users as the head is swept across the ground from side to side, thereby enhancing these changes in the interrogated magnitude of the ground signal, but this action is by no means a necessary requirement for this continuous ground balancing system using the method of correlation, as the ground inhomogeneities produce variations in the received signal's magnitude.

The advantages of using a time averaged correlated signal between changes in the reactive and object channels are that the detector measures the amount of predominant ground signal present in the object channel and rapidly and continually adjusts this signal to zero. Furthermore the correlator technique will adjust out this ground component with an accuracy which is comparable with the most careful manual adjustment and with a speed which is many times faster.

Difficulties can arise in providing a continuing ground balancing effect using the principle of correlation, namely getting a feedback loop to respond quickly but maintain its stability for a wide range of ground conditions.

This problem can arise out of the fact that the strength of the integrated correlation signal will be proportional to the strength of the reactive signal. A small error in the ground balance control in the presence of a large reactive signal will produce a large component in the object channel giving rise to a large correcting signal. This will lead to instability if the loop gain is too high; indeed, if the loop gain is too high, the system displays many typical characteristics of non-linear systems, such as bification. When ground containing low concentrations of ferrous oxides is encountered the reactive signal is proportionally small and large errors in the degree of ground balance produce only a small component in the object channel giving rise to small correcting signals. This produces a very long time constant in the loop if the loop gain is too low, and although the loop is stable, an unacceptable delay is produced in correcting the ground balance.

The problem can be overcome by providing means to detect the extent of total reactive signal and means to adjust loop gain so that with higher magnetic concentration in the target ground location the loop gain will be accordingly reduced.

This can be achieved as follows: the signal from the reactive channel X or high passed reactive signal $Xa$ is rectified and passed to a peak detector to determine the strength of the reactive signal. The peak detector can have a droop time constant of the order of several seconds. A peak detector is more satisfactory than a low pass filter with a similar time constant because, unlike the filter, transient responses in "X" do not cause momentary instabilities since the gain is immediately reduced. The output of the peak detector is fed to a divider as the divisor which attenuates the loop gain. The operation of this divider is such that the divisor has a lower limit, thereby not enabling division by zero.

With reference to FIG. 1 it is possible to set the "constant of proportionality" of the divider such that the "gain" of the high passed object signal, "Rm", fed through the divider can be considered constant for values of the divisor above its preset lower limit. In this instance the gain of "Rm" is defined as the pulse response magnitude of "Rm" to a specific step response in the reactive component for a specific misalignment of the "R" demodulator to the ground vector. Thus the gain of the feedback loop responsible for the "automatic ground balance" is independent of ironstone concentration if the divisor is greater than its preset lower limit, and the "free-air" value of "X" much less than the operating value of "X".

The invention may be better understood by reference to a preferred embodiment which shall now be described with reference to the accompanying drawings wherein FIG. 1 shows a block drawing illustrating the arrangement for a first embodiment.

Figure 1:
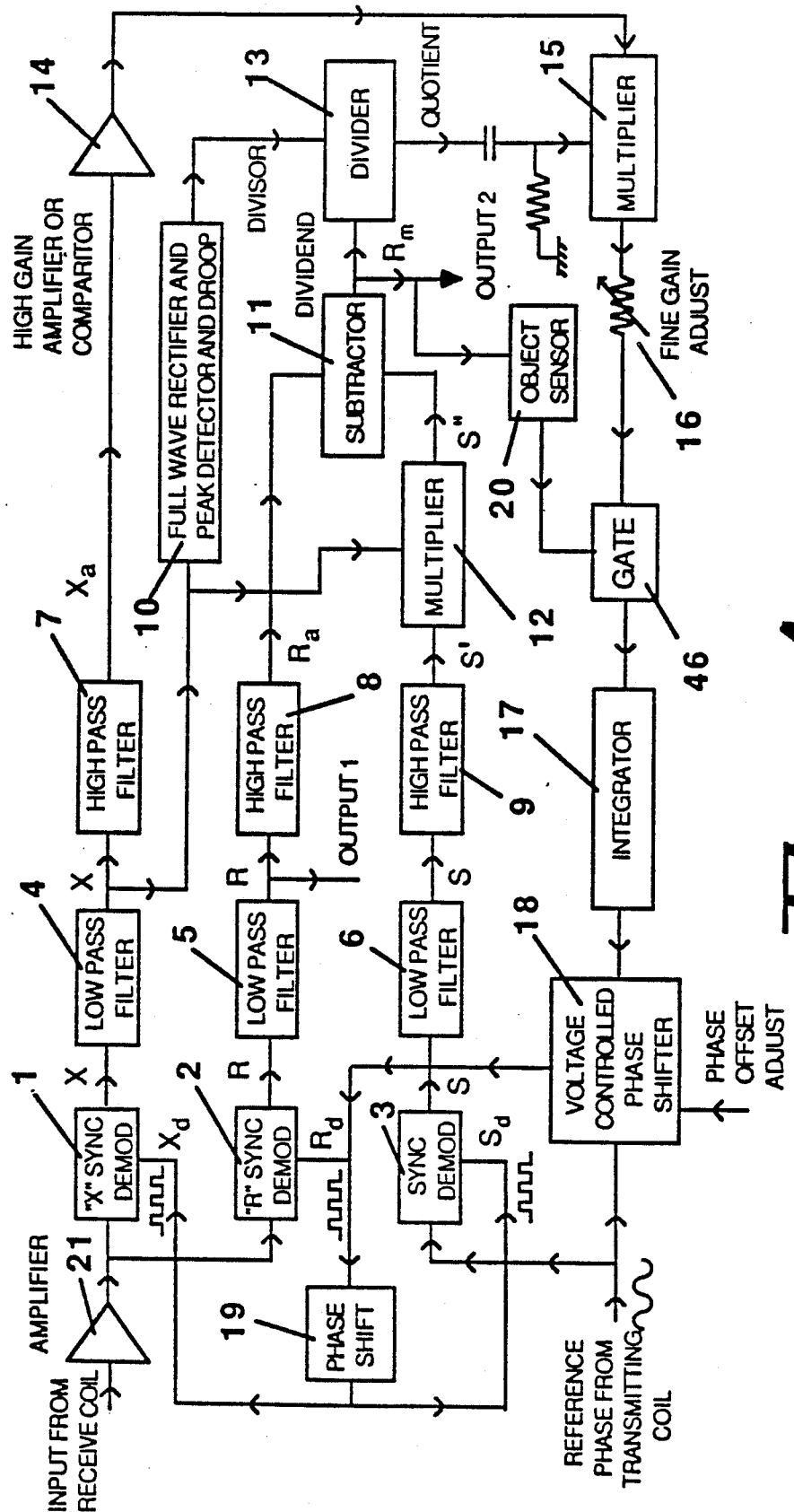

The first embodiment as shown in functional blocks in FIG. 1 involves the use of a correlator for correcting the ground signal component in the object channel, "Rm". The signal is first pre-amplified by amplifier 21. "R" and "X" signals are produced by demodulators 1 and 2. The circuit is thus arranged that each signal passes through a pair of low pass filters substantially matched in temporally response 4 and 5 with a (D.C.) output signal for sensing the presence of an object being taken from output 4,5.

From the low pass filters 4 and 5 the signals are passed through a pair of high pass filters 7 and 8 substantially matched in temporal response, giving Xa and Ra, with the reactive component Xa passed through either a high gain amplifier, or a comparator 14 to produce a signal of fixed amplitude but whose sign depends on the sign of Xa. The resistive component Ra passes to a subtractor 11 where a multiple of the reactive component Xa from multiplier 12 is subtracted from it.

The purpose for the subtractor will be explained later.

The resistive component is then passed as the dividend to a divider 13, where the divider is a processed signal from the reactive channel. The quotient from the divider is then multiplied by the output of comparator/amplifier 14 in multiplier and then passed through a gain control 16, to an integrator 17. The output of the integrator is connected to voltage controlled phase shifter 18 to control the phase set relative to the transmitted phase to the demodulators 1,2, and 3 based on the input voltage to the voltage controlled phase shifter 18. The 90° phase shift required for the channel of X demodulator 1 and for the input signal to the demodulator 3 comes from the fixed phase shifter 19.

The sections of the circuit comprising 3, 6, 9, 10, 11, 12, 13, are for the purpose of stability and time constant control in the feedback loop.

An additional problem arises out of signal components in "Ra" which result intrinsically from the effects of changing the phase angle of the "R" demodulator for a non-zero value of "X". Consider for example the situation where the magnetic environment of the sensing coil is steady and the value of "X" is non-zero. If the phase reference Rd referenced to the transmitted signal is shifted, the value of "R" changes owing to the change in the projection of the unbalanced signal at the demodulator inputs on the sensitive vector axis of the "R" demodulator. These components detract from the intrinsic correlation process as they are unrelated intrinsically to the correlated ground components and can be eliminated by subtracting a signal "S" from "Ra" to give "Rm" which is free of these components.

The method for removing these components is as follows. Through the action of the demodulator 3, S is proportional to the sine of the phase difference between the induced component Xd of the phase reference, and the transmitted phase (here the "d" indicated the digital nature of these signals), such that S=0 if Xd and the transmitted current phase are 90° out of phase, and S is a maximum for the in-phase condition. S' is the signal after passing through low 6 and 9 pass filters matched in temporal response to the filters in the "X" and "R" channels, so that S' represents the change in the phase angle.

Thus the output of the multiplier 12 is proportional to the product of S' and X=S" as indicated, which in turn is proportional to the intrinsic signal to be removed from "Ra". Subtraction of S" from "Ra" (scaled appropriately) therefore removes this unwanted component of Ra.

Note: "Ra" and S" can be correctly scaled by making sure $Rm$ is a minimum for changes in the phase of Rd, for a fixed input signal that results in non-zero value of X.

Note that the part of the system intended to remove signals in "Ra" intrinsic to variations of phase in Rd (viz; the "S" channel) may be omitted, but with a corresponding reduction in performance.

There is a yet further problem in providing continuously ground balancing detectors using the principle of correlation, namely as the sensing coils pass over a target object in the ground, the presence of the "X" and "R" signal from the target modifies the measured "X" and "R" signal from that of the local soil. Indeed it is precisely this modification which is used to detect the presence of an object. To overcome the difficulty of the correlator system attempting to correct the phase angle of the "R" channel owing to the measured resultant of the ground plus object, thereby unbalancing the detector from the ground balanced phase position, the integrator is inhibited by a switch 46. The switch is opened if the averaged absolute value of Rm is exceeded by a fixed multiple of the absolute value of Rm. This relative level sensing of Rm is processed in the object sensor 20.

The fixed 90° phase shifter in FIG. 1 may be some other angle than 90°, for example, 45°.

This may be advantageous in situations where the sought after objects have a specific loss to inductive ratio, for example 45 degrees, in which case the correlator does not attempt to correct for the object, but rather, to a first order approximation ignores it and is only sensitive to the ground.

It should be noted however that the elimination of the unwanted components intrinsic to the process of changing the phase angle, is most accurately achieved when the phase is set approximately 90° relative to the transmitted phase plus whatever phase shift is caused by preamplifier 21.

The control system described above with reference to FIG. 2 which adjusts the variation of the gain of the feedback loop in FIG. 1 can be performed manually for "manual" detectors. In this instance, the operator perceives the tuning-in time or instability of the detector and adjusts the feedback gain accordingly.

This does however require that the operator perform adjustments regularly in relatively inhomogeneous ground for optimum results.

In practice this procedure is not desirable because if the reactive component suddenly increases, the feedback loop can become unstable which may result in a substantial rapid phase angle change. Upon reducing the feedback gain to regain stability, a lengthy correction period is required.

Using the control described above, advantageous results can be made possible, and the tuning-in time can be set by the operator to obtain the best compromise between the tuning-in time and stability.

This adjustment can be achieved by varying the fine gain adjust 16 in FIG. 1.

The A.C. output of the detector is shown as output 2 in FIG. 1 where the phase correction "noise" has been removed from the "R" signal. Note: the RC decoupling combinations simply remove d.c. offsets from the divider, and depending on the technology, may not be necessary. In addition some of the functional blocks may be placed in different positions, for example the multiplier 15 may be placed between the subtractor 11 and the divider 13, without changing the principle of operation.

Figure 2:
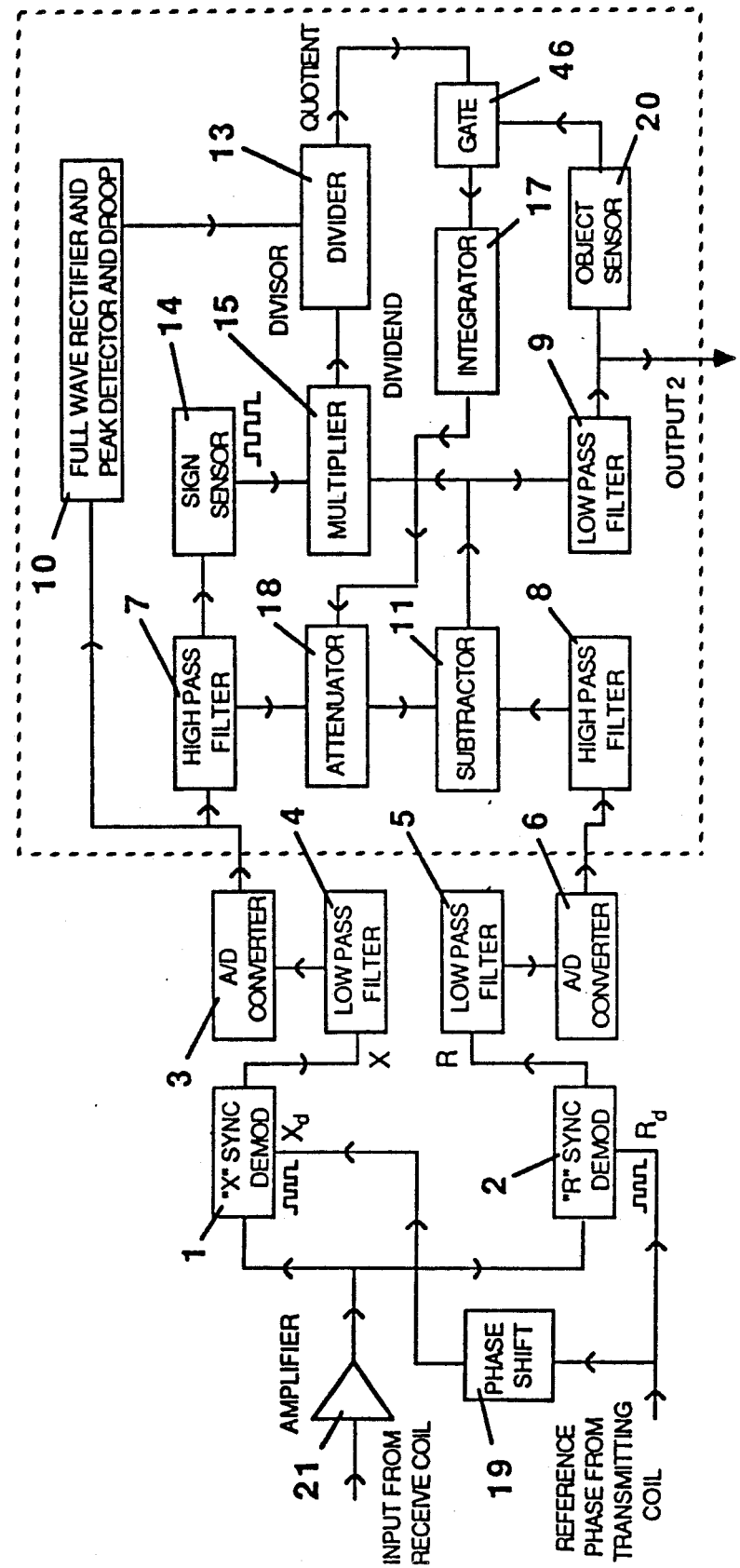
FIG. 2 is a block drawing showing the arrangement for a second embodiment.

The system can be realised in many different types of electronic technologies, for example FIG. 2 shows the correlation principle employed to determine the amount of high passed "X" signal present in the high passed "R" channel and then subtracting this component directly from the high passed "R" channel without changing the phase angle.

This procedure requires very high precision with a large dynamic range to cover all possible ground conditions and can be implemented (though not necessarily) with digital techniques using a microprocessor. The signal from the "X" and "R" channel are demodulated with demodulators 1 and 2 and pass through low pass filters 4,5 to prevent aliasing and are then converted to digital form using high precision analog to digital converters 3,6. The signals are then (digitally) filtered in filters 7,8 and a fraction of the "X" channel signal determined by the correlation) is then (digitally) subtracted in subtracter 11 from the "R" channel which is then (digitally) low pass filtered 14 to reduce noise to produce the output channel.

The correlator operates in the same way as previously described with the sign of the "X" channel being determined by sign sensor 14, and being multiplied by the processed "R" channel in multiplier 15, and integrated in integrator 17 to determine the extent of the "X" channel remaining in the "R" channel. The usual sensing procedure using rectifier/peak detector 10 is used to determine and correct using divider 13 for the gain in the feedback loop. Again the integrator is inhibited by the same procedure described above, that is when the output signal deviates from zero by a statistically significant amount as detected by object sensor 20, the integrator is inhibited by the opening of the switch 46.

The functional blocks can again be shifted without changing the basic principle of operation. For example, the division process can preceed the correlation process before the integration process. Here the microprocessor can be used to advantage by the implementation of various "adaptive" processes such as filters which continually adjust according to the various ground conditions.

Figure 3:
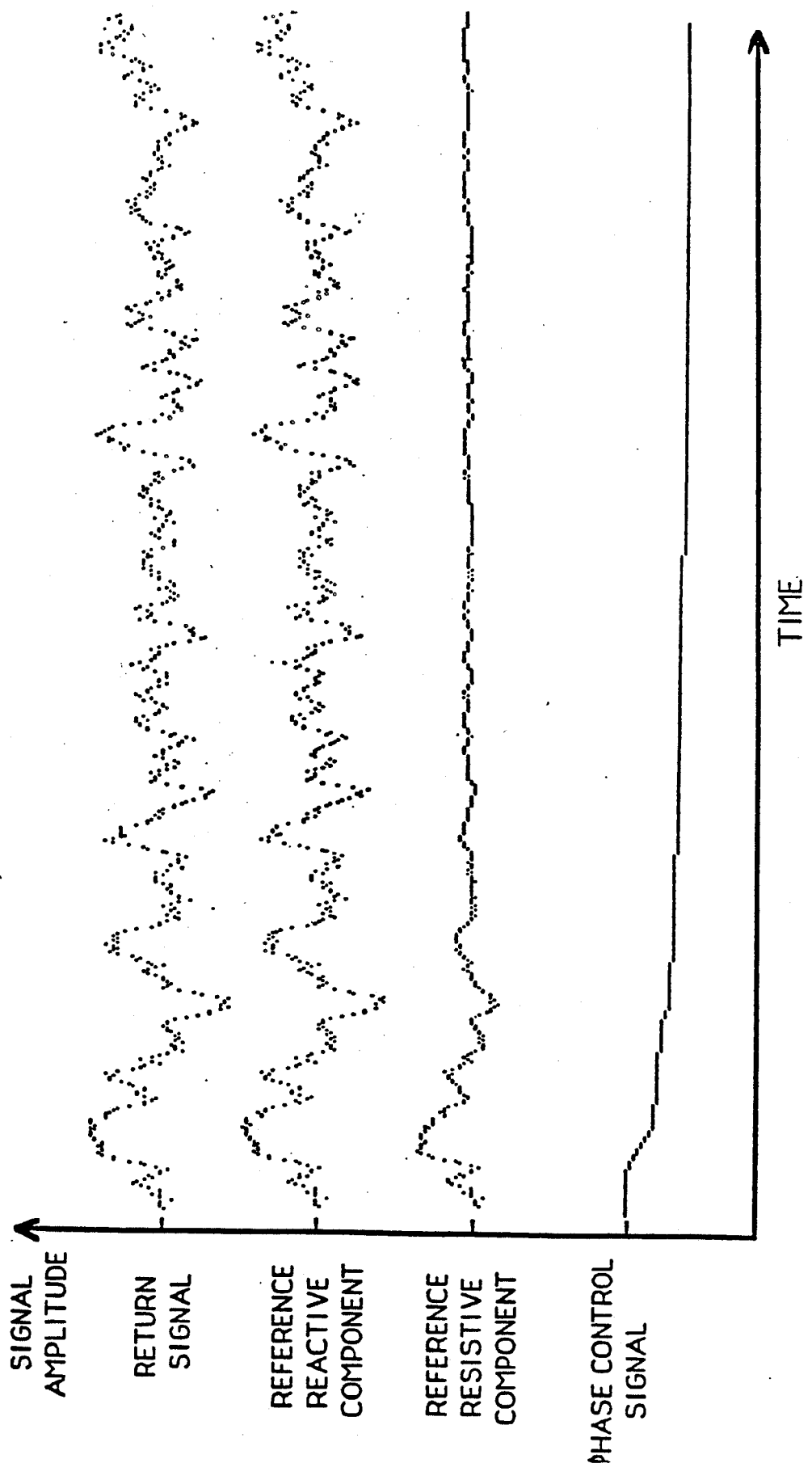
FIG. 3 is a graphical display illustrating some typical outputs.

FIG. 3 shows a typical time trace for the "X" and "R" channels for the detector as the correlator corrects for the "X" component present in the "R" signal. Note the strong correlation between the resistive channel and the reactive channel at the start of the trace. As the phase control adjusts the phase angle, the component of "X" in "R" is reduced to almost zero with only the "true" resistive component remaining.

Some dry sandy beaches and other soils may produce very little interfering signal, while other ground conditions containing perhaps heavy ironstone (ferrous oxide) concentrations, and/or mildly electrically conducting components such as some clay deposits, moist salty conditions, produce severe interference, making detection of valuable objects in such soils difficult and in some cases almost impossible.

One reason for the importance of obtaining a detection system which can operate under these conditions is that such conditions are often encountered when prospecting for gold. They result from the weathering of the ironstone-quartz reefs which contain the gold. The ironstone mineralisation is distributed in wide areas around the reef and is bound in the clays and soils which often contain the gold nuggets originating from the reef. There are well known techniques for minimising this interference from the ground which will become apparent as the content of this invention is explained.

Figure 4:
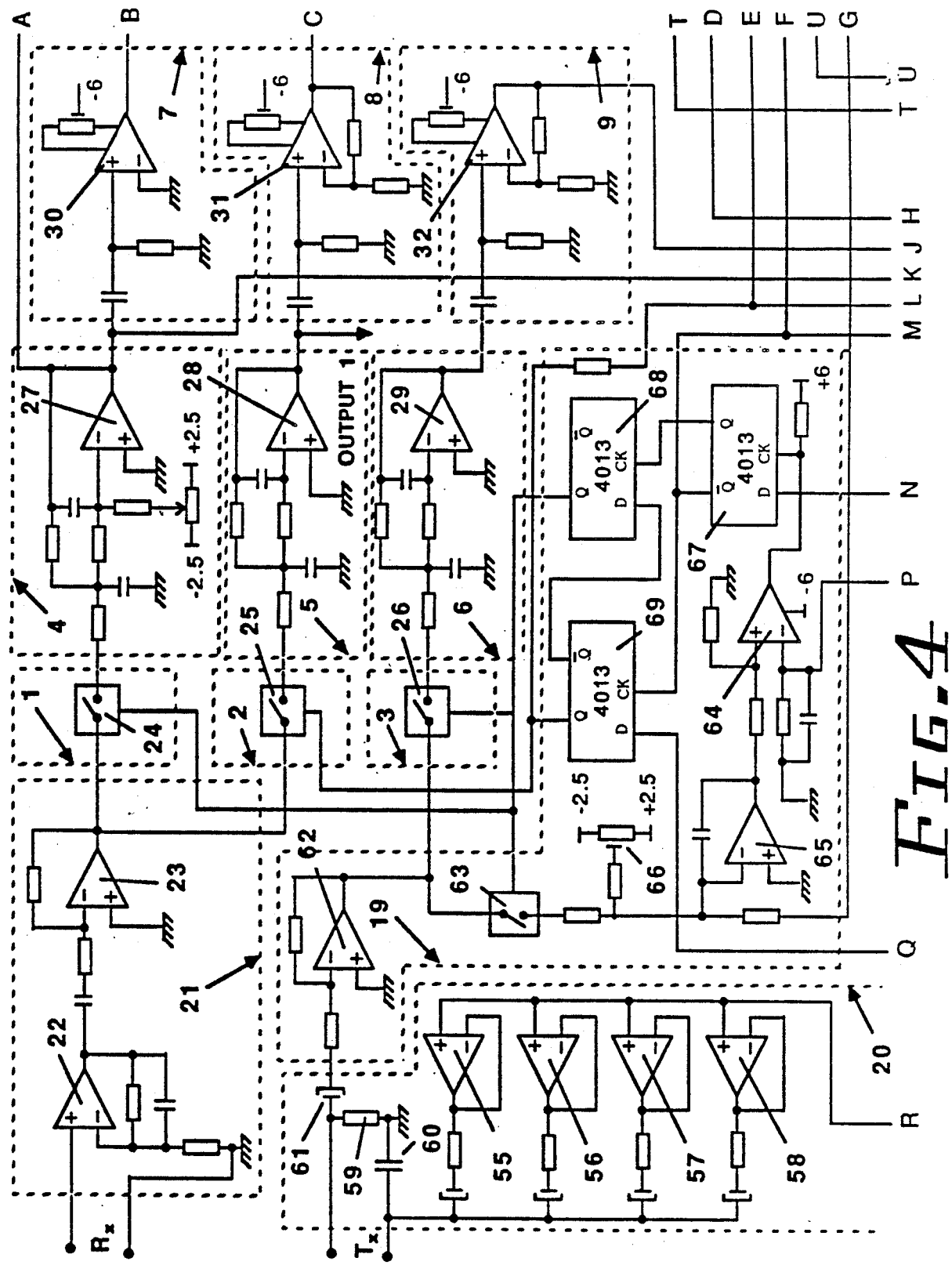
FIG. 4, FIG. 5 and FIG. 6 are each circuit details of the preferred embodiment the circuits shown being in each case a circuit part interrelated to the other parts by having common letters identifying circuit lines intended to be connected together.

The input signal from the receiver coil Rx goes to the circuit 21 consisting of two amplifiers 22 and 23 shown in FIG. 4. The demodulators 1 and 2 switch the signal using MOSFET switches 24 and 25. Switch 24 produces the reactive channel and switch 25 produces the resistive channel.

After demodulation the signal passes through low pass filters 4, 5 which remove high frequency components of the switching.

From filter amplifiers 27 and 28 the signal then passes to high pass filters 7 and 8. Filter 7 consists of a single pole RC filter followed by a high gain amplifier 30 with a filter 8 having analogous structure including amplifier 31. The D.C. output signal is taken from the output of amplifier 28 (output 1). From the high pass filter 8 (Line C) the signal goes to subtracting circuit 11 shown in FIG. 5 which uses an amplifier 54 operating as a summing amplifier.

As the phase of the signal is reversed in the S circuit the summing amplifier 54 subtracts unwanted phase shift signal from the "R" channel. The signal from high pass filter 7 and amplifier 30 (FIG. 4) is further amplified at 53 and 52 (FIG. 5) to produce a clipped wave form to operate switches 49 and 50. From the output of subtractor 11 an output A.C. signal (output 2) can be taken from the amplifier 54. A signal is also taken from the output of the "X" channel low pass filter 4 (line A) and goes to the peak detector and droop circuit 10. This signal is first full wave rectified by amplifier 33 and then the peak is determined by the action of the amplifier 34 charging the capacitor 35 through a diode. The capacitor is discharged with a time constant t determined by resistive chain 36.

In this way the circuit "memorises" the magnitude of the reactive signal "X" which is present and this signal becomes the divisor of a dividing circuit 13.

To obtain the required dynamic range, precision, and temperature stability necessary for the division a digital-/analog hybrid circuit dividing circuit 13 is used.

Two 4 bit up/down counters 41, 42 drive two 8 bit digital to analog converters (D/A) 39,40 which use the same data bits. These two D/A converters track each other and one 40 uses a feedback circuit which includes the comparator 38. The sign of the comparator determines whether the counters count up or down and in this way the output from 40 tracks the output from 37.

Figure 6:
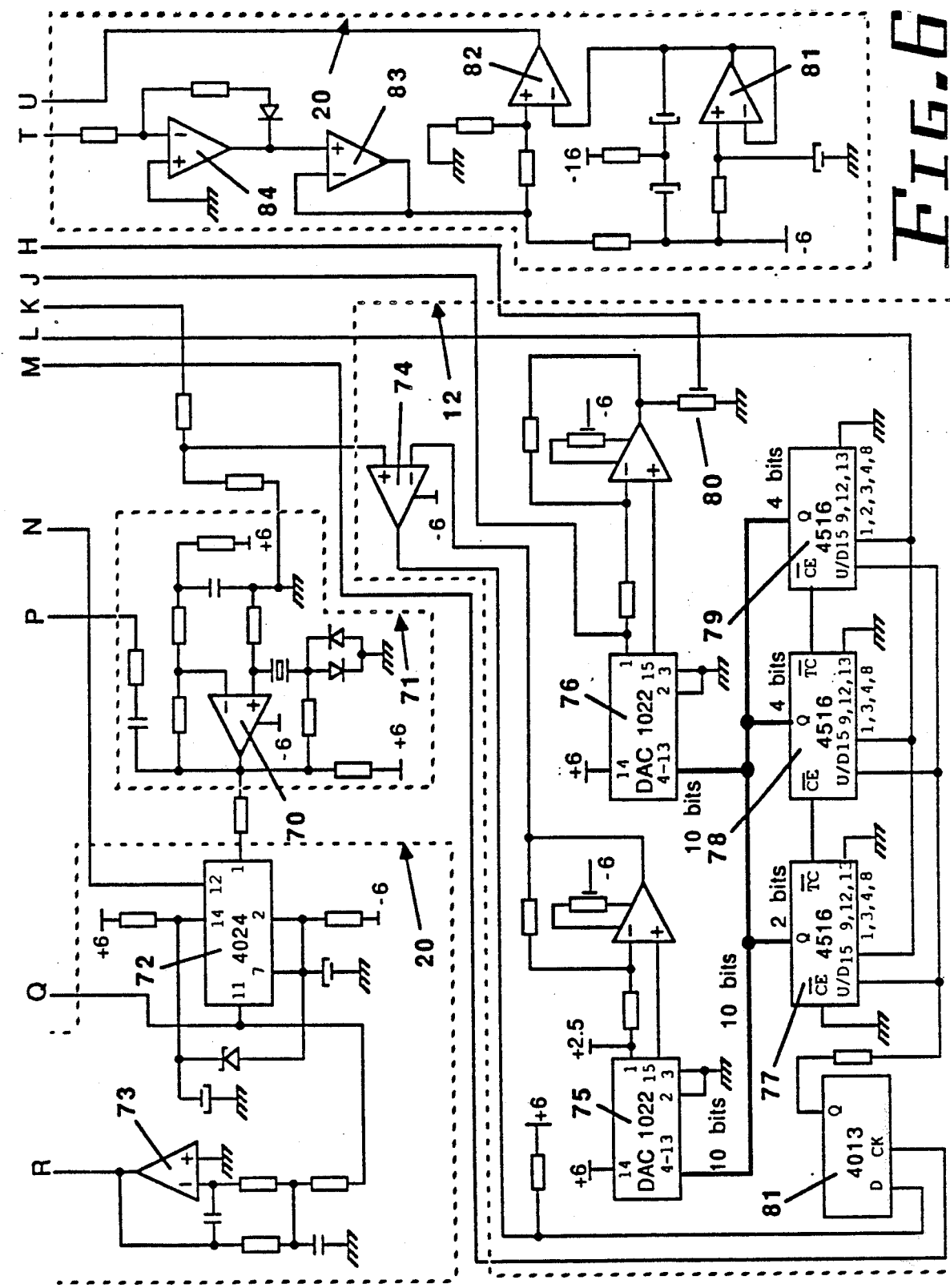

The clock rate for the counters 41, 42 and the data latch 47 are taken from a divided frequency from the crystal oscillator circuit 71 (shown in FIG. 6).

Figure 5:
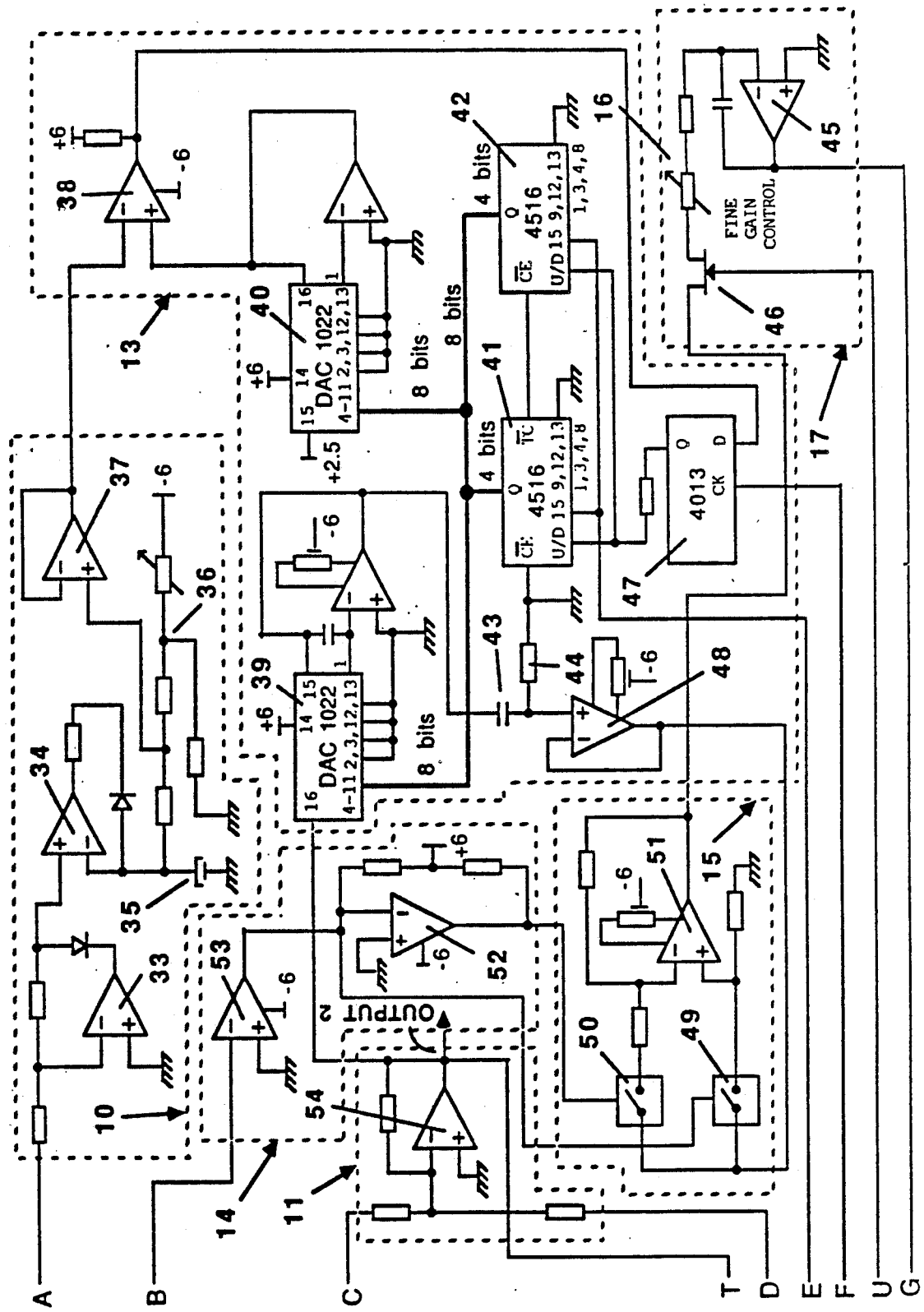

The multiplying D/A 39 and associated operational amplifier in FIG. 5 are connected as a dividing circuit with one input (dividend) coming from subtractor 54 and the other (divisor) from peak droop circuit 37 through the 8 input bits. The output of the divider circuit passes through a high pass filter 43, 44 to a voltage follower driver 48, the output of which is switched by the switches 49,50.

The purpose of the high pass RC filter is to remove any D.C. component from the divider.

The multiplying circuit 15 multiplies the signal from the divider by the sign of the high passed signal from the "X" channel through the action of the inverting/noninverting switches 49,50 and amplifier 51.

This signal then passes to the integrator circuit 17 composed of integrating amplifier 45 together with an integrating gain controller 16.

The integration process is inhibited if the FET switch 46 is opened. This is enabled by the action of the object detecting circuit 20, shown in FIG. 6, which has its input T, as the "AC" output. It comprises a full-wave rectifier 84 and 83, and an averaging circuit, namely, the low pass filter 81. If a multiple of the absolute value of the input signal exceeds the averaged value, the comparing amplifier 82, which is connected to integrator 17 produces a signal and opens the switch 46 and thus inhibits the integrator 17.

Line G from the integrator alters the phase angle of the demodulating circuits 1 and 2 by controlling the voltage controlled phase shifting circuit 19 of FIG. 4. Phase shifting circuit 19 is driven by the crystal oscillator 70 and dividing circuit 72 (FIG. 6) and consists of a phase locked loop whose phase follows the phase of the current signal in the transmitting Tx coil through the action of the resistance 59 and amplifier 62.

Driver amplifiers 55,56,57,58 in Fig. 4, drive the resonant tank circuit composed of the inductance of the transmitting coil and capacitor 60.

The value of capacitor 60 is adjusted to make the natural resonant frequency of the tank circuit equal the driving frequency. Filter 73 filters out the harmonics from the crystal oscillator frequency dividing circuit 72 and drives the coil drivers (line R). Output from amplifier 62 passes through the demodulator 63 which is integrated by integrator 65 to control the switching level point on a quasi triangular wave generated from the oscillator 70 and by this means lock the phase of the output of 68 to the phase at the amplifier 62 (phase shift 90°) Latch 67 is used to produce the clock.

The additional 90° phase shift from latch 69 drives the "R" demodulator. Phase shift is controlled by the voltage on line G which causes a current to flow to the virtual earth of the inverting input of the integrator causing a corresponding shift in the D.C. component at the demodulator 63 output to maintain locked phase. Thus the phase of the phase locked loop is shifted with respect to the output of amplifier 62.

The phase range can be centred with the potentiometer 66.

The demodulator 3 is also driven by the current sensing amplifier 62 with the output of the demodulator passing through the low pass filter 6and high pass filter 9. Line J from the high pass filter goes to multiplier 12 which uses an A/D tracking converter which operates on the same principle as the divider.

However in this case line J goes to the reference of the multiplying D/A 76 where the signal is multiplied by the 10 bits to produce an output signal attenuated by 80 and going to line H. Tracking is accomplished using the comparator 74. Potentiometer 80 is used to change the gain from the multiplier and this is adjusted to null out the inherent phase shift signal present in the "R" channel.

The claims defining the invention are as follows:

1. Apparatus for detecting remote metal objects in an interrogated environment by means of magnetic interrogation, comprising:

transmitting means for transmitting an alternating magnetic signal;

receiving coil means for receiving induced signals, which are in part from the transmitting means and from the interrogated environment;

means, connected to the receiving coil means, for amplifying the received signals.

first and second synchronous demodulator means connected to said amplifier means, for synchronously demodulating with respect to a transmitting frequency;

a first and second low-pass filter means, respectively receiving outputs of said first and second synchronous demodulator means;

a first and a second signal change determining means, respectively connected to outputs of said first and second low-pass filter means, for detecting changes in a magnitude of said first and second low-pass filter output signals;

means for cross correlating outputs of said first and second signal change determining means;

integrator means for integrating an output of said cross correlator means;

controlled phase shifter means receiving an output of said integrator means, for producing a controlled phase shift based thereon, a signal provided by said transmitting means being fed to an input of said controlled phase shifter means;

wherein an output of said controlled phase shifter means is fed to a reference input of said first synchronous demodulator means, and first phase shifting means coupled to the controlled phase shifter means for shifting the output thereof, and for providing the shifted signal as a reference to said second synchronous demodulator means.

2. A metal detection apparatus according to claim 1 wherein a phase shift of said first phase shifting means is selected to provide said second synchronous demodulator a reference phase that is substantially in phase or one hundred and eighty degrees out of phase with a received and amplified reactive interrogated component at an input to said second synchronous demodulator means.

3. A metal detection apparatus according to claim 1 further comprising a sign detector means coupled between the output of said second signal change determining means and an input to said cross correlator means, where the output to said sign detector means is fed to the input of said cross correlator means, said detector means for providing an output signal that is constant in absolute value, and having a sign determined by the sign of an input thereof.

4. A metal detection apparatus according to claim 1, further comprising:

rectifier means for rectifying an output of said second low pass filter means;

peak determining means for determining a peak average of an output of said rectifier means;

divider means, receiving an output of said peak determining means as a divisor thereof and inserted between said cross correlator means and said controlled phase shifter means, an output of said controlled phase shifter means being a dividend for said divider means and a quotient of said divider means connected to control said cross correlator means.

5. A metal detection apparatus according to claim 1 further comprising:

third synchronous demodulator means, receiving an output of said controlled phase shifter means as its reference phase and receiving the transmitted signal at an input thereof;

third low-pass filter means, receiving an output of said third synchronous demodulator means;

third signal change determining means for determining changes in magnitude of an output signal of said third low-pass filter means, connected to an output of said third low-pass filter means;

multiplier means for multiplying an output of said third signal change determining means by the output of said second low-pass filter means, said multiplier means receiving outputs of said third signal change determining means and said second low-pass filter means respectively;

subtractor means, for subtracting an output of said multiplier means from said output of said first signal change determining means, the output of said subtractor means being an input for said cross correlator means.

6. A metal detection apparatus according to claim 5 where said first, second and third signal change determining means are high pass filter means, each having substantially the same temporal characteristics, and said low-pass filter means each have substantially the same temporal characteristics.

7. A metal detection apparatus according to claim 4 where said peak average determining means includes a peak detector, with a same signal sense as the output of said rectifier means, and which has a decaying memory, which decays in time and is refreshed to a value of each peak that exceeds in value a value of said decaying memory, where said decaying memory is constrained to exceed a fixed small value which has a same sign as a sign sense of the output of said rectifier means.

8. A metal detection apparatus according to claim 3 is further comprising:

third synchronous demodulator means, receiving the output of said controlled phase shifter means as its reference phase, and receiving the transmitted signal as a signal to an input thereof;

third low-pass filter means for filtering an output of said third synchronous demodulator means;

third signal change determining means which is connected to an output of said third low-pass filter means, for determining changes in a magnitude of the output signal of said third low-pass filter means;

multiplier means, to which outputs of said third signal change determining means and said second low-pass filter means are fed respectively, for multiplying the output of said third signal change determining means by the output of said second low-pass filter means; and subtractor means for subtracting the output of said multiplier means from said output of said first signal change determining means, the output of said subtractor means being an input for said cross correlator means.

9. A metal detection apparatus according to claim 8 further comprising:
   a rectifier means for rectifying an output of said second low pass filter means;
   peak average determining means for detecting a peak average of an output of said rectifier means;
   divider means receiving an output of said peak determining means as a divisor thereof, and inserted between said subtractor means and said controlled phase shifter means, an output of said subtractor means being a dividend thereof and a quotient feeding said cross correlator means.

10. A metal detection apparatus according to claim 8 where
    said first, second and third signal change determining means are high-pass filter means each having substantially the same temporal characteristics; and
    said low-pass filter means each have substantially the same temporal characteristics.

11. A metal detection apparatus according to claim 9 wherein
    said peak average determining means includes a peak detector, with a same sign sense as an output of said rectifier means, which has a decaying memory, decaying in time and refreshed to a value of each peak that exceeds in value a value of said decaying memory, where
    said decaying memory is constrained to exceed a fixed small value which has the same sign as the sign sense as the output of said rectifier means.

12. An apparatus for detecting remote metal objects in an interrogated environment by means of magnetic interrogation, comprising:
    transmitting means for transmitting an alternating magnetic signal;
    receiving coil means for receiving induced signals in part from the transmitting means and from the interrogated environment;
    amplifier means, for amplifying said induced signals;
    a first and a second synchronous demodulator means, for synchronously demodulating an output of said amplifier means with respect to a transmitting frequency;
    first and second signal low-pass filter means for respectively filtering the outputs of said first and second synchronous demodulator means;
    first and second change determining means for respectively determining changes in a magnitude of outputs of said first and second low-pass filter means;
    controlled gain stage means, receiving an output of the second change determining means;
    subtractor means, receiving an output of the first change determining means and an output of said controlled gain stage means;
    cross correlator means, receiving outputs of said second signal change determining means and said subtractor means;
    integrator means for integrating an output of said cross correlator means, an output of said integrator means controlling said controlled gain stage means;
    phase shift means producing a reference signal and providing it as a reference to said second synchronous demodulator means, where
    said phase shifting means being selected to provide said second synchronous demodulator means with a reference phase that is substantially in-phase or one hundred and eighty degrees out of phase with the received and amplified reactive interrogated component at an input to said second synchronous demodulator means.

13. A metal detection apparatus for detecting the presence of conducting metal targets in soil according to claim 12 further comprising: rectifier means for rectifying an output of said second low pass filter means;
    peak average determining means for determining a peak average of an output of said rectifier means;
    divider means, receiving an output of said peak determining means as a divisor thereof, said divider means being inserted between said cross correlator means and said integrator means with an output of said cross correlator means being a dividend to said divider means and a quotient of said divider means feeding said integrator means, where
    said peak average determining means includes a peak detector with the same sign sense as the output of said rectifier means, and which has a decaying memory, decaying in time and refreshed to a value of each peak that exceeds in value a value of said decaying memory, where
    said decaying memory is constrained to exceed a fixed small value which has the same sign sense of the output of said rectifier means.

14. A metal detection apparatus according to claim 12 where said first and second signal change determining means are high-pass filters which each have substantially the same temporal characteristics.

15. A metal detection apparatus for detecting the presence of conducting metal targets in soil according to claim 12 further comprising:
    rectifier means, for rectifying an output of said low-pass filter means;
    peak average determining means for determining a peak average of the output of said rectifier means
    divider means, receiving an output of said peak determining means as a divisor thereof, said divider means being inserted between said integrator means and said controlled gain stage means, and an output of said integrator means being a dividend thereof and a quotient controls said controlled gain stage means, where
    said peak average determining means includes a peak detector with a same sign sense as an output of said rectifier means, which has a decaying memory, decaying in time and refreshed to a value of each peak that exceeds in value the value of said decaying memory, where
    said decaying memory is constrained to exceed a fixed small value which has a same sign sense as the output of said rectifier means.

16. A metal detection apparatus for detecting the presence of conducting metal targets in soil according to claim 15 where
    said first and second signal change determining means are high-pass filter means which each have substantially the same temporal characteristics, and
    said low-pass filter means each have substantially the same temporal characteristics.

* * * * *